June 26, 1934.      F. E. PAYNE      1,964,272
PACKING
Filed Feb. 17, 1932
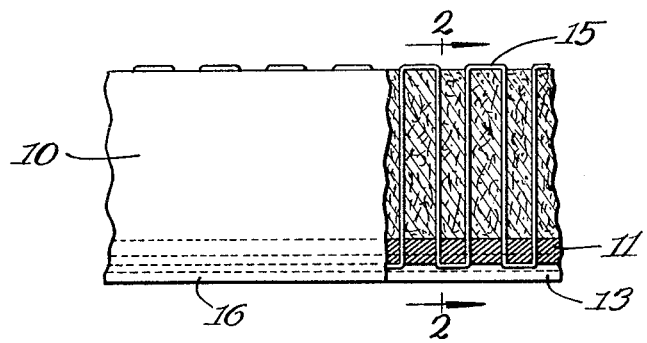
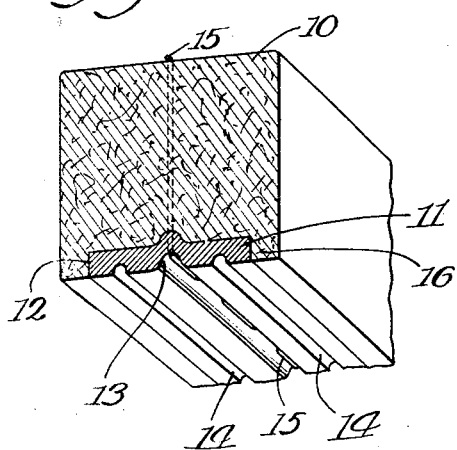  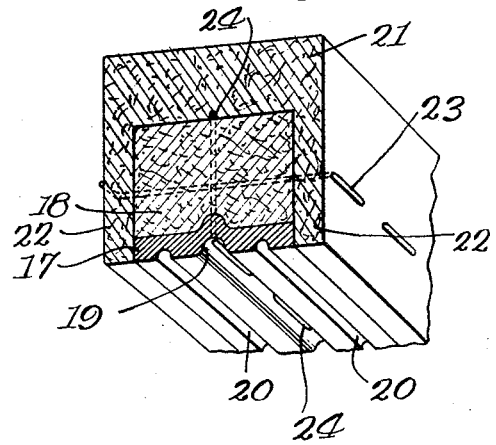
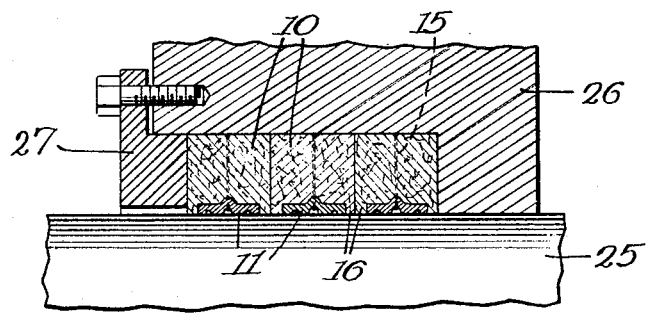
Inventor
Frank E. Payne
By Rector, Hibben, Davis & Macauley Attys.

Patented June 26, 1934

1,964,272

UNITED STATES PATENT OFFICE 1,964,272

PACKING

Frank E. Payne, Glencoe, Ill., assignor to Crane Packing Company, Chicago, Ill., a corporation of Illinois Application February 17, 1932, Serial No. 593,467

5 Claims. (Cl. 154—45.5)

My invention relates to packing and it is primarily concerned with devices of this nature which may be manufactured in flexible lengths and cut to fit any particular operating condition.

One object of my invention is to devise a flexible packing having a sealing face and a resilient backing therefor which is deformed under the pressure of the gland in the stuffing box, or otherwise, to cause a close contact of the sealing face with the part to be sealed.

A further object is to provide a packing of the character indicated having a metallic sealing face which may be formed of lead, copper, any suitable alloy, or generally a non-scoring metal which further possesses the property of making a tight seal with shafts, rods and rotating or reciprocating parts in general, and particularly under conditions requiring the maintenance of an adequate seal against pressure and under a wide variety of temperatures.

A further object is to devise a packing having a flexible, resilient backing and a metallic sealing face which has formed therein a groove that collects fluid which it is desired to seal, thereby utilizing the latter to improve the sealing capacity of the packing as a whole.

A further object is to provide a means of securing the parts of the packing together, as by sewing or in any other desired manner, the sewing threads, if this method of attachment is used, being preferably located along and in the sealing groove for the purpose of spacing the same from the moving part which the packing encircles and so avoiding wear and destruction of the attaching threads.

A further object is to provide a packing comprising a backing and a sealing strip, both strips being formed of a material having flexible characteristics and the relation of the backing to the sealing strip being such that the former provides wiping members at opposite sides of the sealing strip, the packing being particularly adapted for use with steam, air, hot gases, and hot or cold oil, the material comprising the backing and sealing strips being selected dependent upon the nature of the service.

These and further objects of my invention will be set forth in the following specification, reference being had to the accompanying drawing, and the novel means by which said objects are effectuated will be definitely pointed out in the claims.

In the drawing:

Figure 1 is an elevation, partly in section, of one form of my improved packing as the same appears when viewed from the side thereof.

Fig. 2 is a section along the line 2—2 in Fig. 1, looking in the direction of the arrows, and showing generally the relation existing between the thicknesses of the sealing and backing strips of the packing.

Fig. 3 is a view similar to Fig. 2, but showing a modified arrangement of the part comprising the packing.

Fig. 4 is an elevation, partly in section, illustrating a typical operating condition in which my improved packing may be employed, the packing being shown in sealing relation to a reciprocating rod, three packing rings being shown, although this number may be varied as desired.

The present application relates generally to a modification of the packing disclosed in my joint application, Serial No. 524,660, filed March 23, 1931, the principal difference residing in the relation of the backing and sealing strips in order to meet the peculiar operating demands of certain types of service.

Referring to the drawing, the packing consists generally of a backing strip 10 which may be formed of asbestos, flax, cotton, or generally any non-metallic material which possesses the property of resilience to some degree, and a sealing, or facing strip 11 which may be composed of metal such as lead, copper, an appropriate alloy, or generally any anti-friction metal which is softer than that which composes the part with which the packing may be used. It is contemplated that an asbestos backing strip may be employed for sealing steam, air, hot gases, and hot oils, while a flax or cotton backing strip may be employed in connection with the sealing of cold oils, or other materials having a similar temperature.

The strips 10 and 11 may have a convenient width, but in thickness, this dimension of the strip 10 will be several times greater than that of the strip 11, with the latter having such a measure of thickness as will not interfere with its capacity for being rolled into a ring form. A channel 12 is recessed in one face of the strip 10 along the length thereof for the purpose of receiving the sealing strip 11. After the strip 11 is placed in the channel 12, a groove 13 is formed in the face of the strip 11, intermediate the sides thereof, and extending the length of the strip, or it may be provided prior to placing the strip in the channel 13. At the same time, if desired, a plurality of oil grooves 14 may also be provided in the strip 11, these grooves preferably being parallel to the groove 13.

The formation of the groove 13 causes a projection of the central portion of the strip 11 into the body of the strip 10, as shown clearly in Fig. 2. In addition to utilizing the groove 13 as a fluid collecting receptacle or pocket, advantage is also taken of its disposition for the purpose of securing the strips 10 and 11 together. To this end, the indicated strips may be positively secured together by sewing, as indicated generally by the threads 15 in Figs. 1 and 2, the threads extending completely through the thickness of the packing, as defined by the strips 10 and 11, with the portions thereof which project through the strip 11 being rested in the bottom of the groove 13 for a purpose hereinafter explained. It will be particularly noted that, by disposing the strip 11 in the channel 12, a pair of flexible, spaced, wiper members 16 are provided on opposite sides of the strip 11 which coact in the usual manner with the part to be sealed.

Sewing threads are intended to comprehend wire stitching, or other fastening means may be employed, such as brads, staples and the like.

In Fig. 3 is illustrated an additional type of my improved packing in which a metallic sealing strip 17 is secured to a flexible backing strip 18, both of these strips being preferably formed of the materials indicated above. In the present instance, however, the strips 17 and 18 are characterized by substantially the same width and either before or after being superimposed upon each other, a groove 19, corresponding to the groove 13, is formed in the face of the strip 17, together with such additional oil collecting grooves 20 as may be desired. The superimposed strips 17 and 18 are then secured by the vertically disposed, sewing threads 24, certain portions of the latter being disposed in the groove 19 in the same manner as discussed in connection with the sewing threads 15, and the unit so formed is then inserted in a flexible channel strip 21, with the strip 18 arranged in contact with the bottom of the channel. The strip 21 may be composed of the same materials as for the backing strip 18, or other materials may be adopted as desired. The flexible sides 22 of the strip 21 extend downwardly along the sides of the strips 17 and 18 and the wearing faces of the sides 22 are substantially flush with the wearing face of the sealing strip 17. After being so located, the channel and the inserted strip unit may be secured by the transversely disposed, sewing threads 23.

One particular application of my improved packing is shown diagrammatically in Fig. 4, in which the numeral 25 represents a reciprocating rod or stem that is mounted in a stuffing box 26. In this example, several lengths of the packing, shown in Fig. 2, are cut from the length of packing and encircled around the rod 25 in the stuffing box where it may be subjected to pressure by the usual gland 27. The gland contacts only with the backing strip of the packing and when pressure is applied to this strip, it will be obvious that the latter will tend to move in directions laterally of the gland and specifically a direction in which the sealing strip 11 will be caused to contact closely with the periphery of the rod 25. The resilient nature of the strip 10 will effect substantially a uniform pressure over the entire area of the sealing strip, so that the latter will bear uniformly throughout its entire width on the rod 25, with manifest improvement in its sealing capacity, as well as a maintenance of the life of the packing over a greater period by reason of uniformity in wear. The provision of the groove 13 in the strip 11 assists in establishing the desired seal, for lubricating oil tends to collect in this groove and acts as a self-sealing agent, while the wiper members 16 will prevent the passage of deleterious material that might otherwise accumulate between the sealing strip and the rod 25.

Packing of the foregoing nature is susceptible of being manufactured in either ring or spiral form and of a great variety of materials, although those suggested above are preferred for the characters of service indicated. The strip 11 provides an anti-frictional contact with the rod or shaft with which it may be cooperating, so that no undue frictional drag is added to the apparatus by the use of the present packing. The grooves 13 and 19, in addition to acting as oil collecting receptacles, also enable the sewing thread to be effectively spaced from the periphery of the cooperating rod or shaft, so that these threads are not subjected to wear which might otherwise result in a separation of the component parts of the packing.

While I have shown one set of elements and combinations thereof for effectuating my improved packing, it will be understood that the same is intended for purpose of illustration only and in no wise to restrict the article to the exact forms and structures shown, for many changes may be made therein without departing from the spirit of my invention.

I claim:

1. Packing comprising a flexible backing strip having a channel recessed therein along the length thereof to define a spaced pair of flexible wiping members, a flat, continuous sealing strip having sufficient thinness to permit bending around a cooperating part secured in said channel between said members and having a groove running lengthwise thereof, the formation of said groove causing the adjacent portion of said sealing strip to extend into the body of said backing strip, and stitching securing said strips together located in said groove.

2. Packing comprising a flexible backing strip having a channel recessed therein along the length thereof to define a spaced pair of flexible wiping members, and a flat, continuous sealing strip having sufficient thinness to permit bending around a cooperating part secured in said channel between said members having a groove intermediate the sides thereof running lengthwise of the sealing strip and one or more oil grooves in parallel relation to said first named groove, and stitching securing said strips together located in said first named groove.

3. Packing comprising a flat, continuous, metallic sealing strip having sufficient thinness to permit bending around a cooperating part and a backing strip, said strips being arranged in superimposed relation and a flexible channel strip for receiving said backing and sealing strips, the flexible sides of said channel strip straddling said sealing strip to provide wiping members therefor, said strip being extremely thin relative to the combined thickness of the backing and channel strips.

4. Packing comprising a flexible backing strip having a channel recessed therein along the length thereof to define a spaced pair of flexible wiping members, a flat, continuous sealing strip having sufficient thinness to permit bending around a cooperating part located in said channel, and stitching securing said strips together, said stitching being offset from the wearing face of said sealing strip.

5. Packing comprising a flexible backing strip having a channel recessed therein along the length thereof to define a spaced pair of flexible wiping members, a flat, continuous sealing strip having sufficient thinness to permit bending around a cooperating part located in said channel, and stitches securing said strips together, those portions of said stitches which are looped through said sealing strip lying in grooves therein to thereby offset said portions from the wearing face of said sealing strip.

FRANK E. PAYNE.